United States Patent [19]

Foote et al.

[11] 4,380,180

[45] Apr. 19, 1983

[54] ENERGY STORAGE FOR INDEXING MECHANISM

[76] Inventors: James C. Foote; Dennis R. Zander, both of 1669 Lake Ave., Rochester, N.Y. 14650

[21] Appl. No.: 155,689

[22] Filed: Jun. 2, 1980

[51] Int. Cl.³ .......................................... B23Q 17/00
[52] U.S. Cl. .................................. 74/821; 74/813 C
[58] Field of Search ............... 74/821, 813 C, 817, 74/DIG. 4, 569, 36, 54; 49/46, 47

[56] References Cited

U.S. PATENT DOCUMENTS

| 2,876,660 | 3/1959 | Malick | 74/821 |
| 3,408,883 | 11/1968 | Rieck et al. | 74/822 |
| 4,301,696 | 11/1981 | Andersson | 74/569 |

FOREIGN PATENT DOCUMENTS

| 10695 | 5/1980 | European Pat. Off. | 74/821 |
| 642718 | 9/1928 | France | 49/46 |

OTHER PUBLICATIONS

IBM Technical Disclosure Bulletin, vol. 23, No. 5, Oct. 1980, J. J. Frederick et al., pp. 1904, 1905.

Primary Examiner—Kenneth Dorner
Attorney, Agent, or Firm—Milton S. Sales

[57] ABSTRACT

The kinetic energy of an intermittently movable work member is converted, independently of its main drive motor, to potential energy during deceleration of the work member as it approaches each of its dwell positions. During the initial portion of the next index step, the stored potential energy is imparted to the work member, again independently of the drive motor, to assist in the work member's acceleration and to reduce the demands on the drive motor. Since the energy storage and transfer occurs independently of the drive motor, armature current and temperature increase in the drive motor is minimized for any given performance level.

1 Claim, 8 Drawing Figures

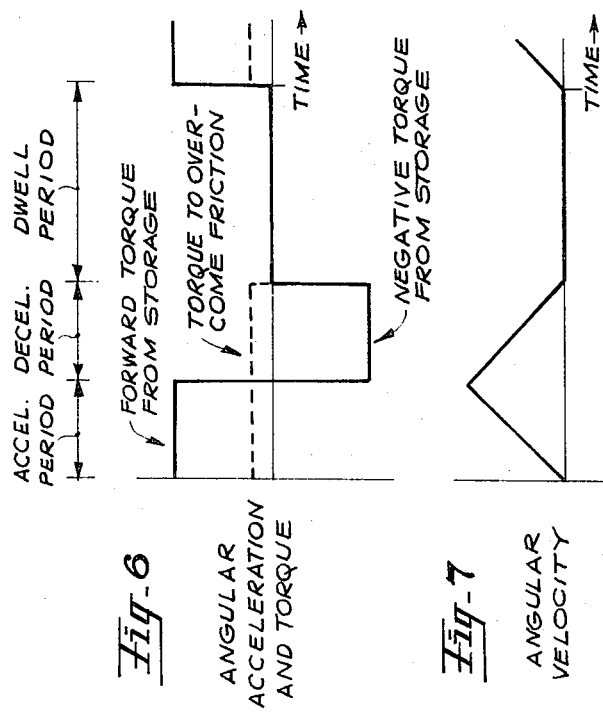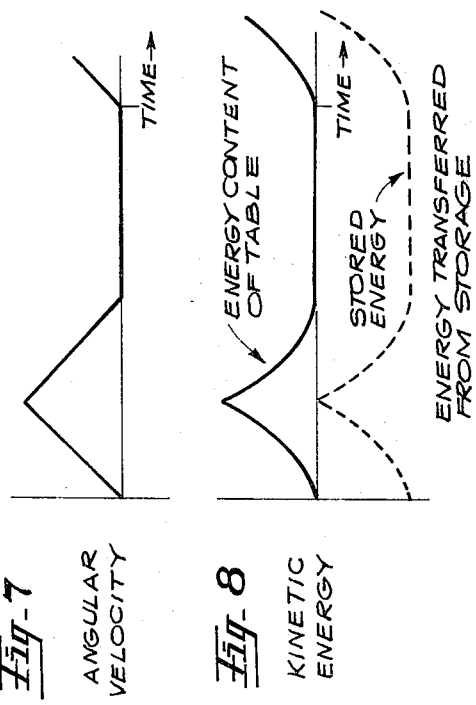
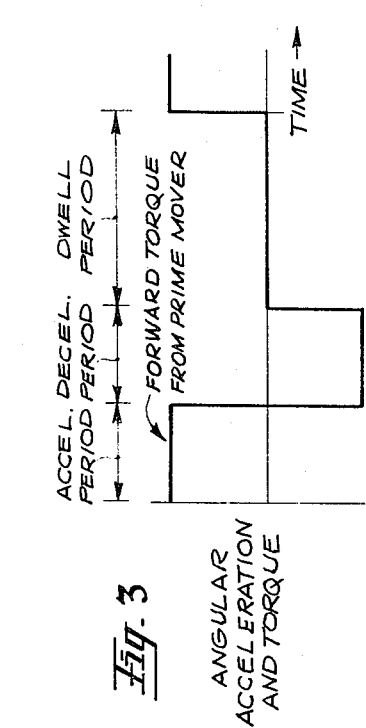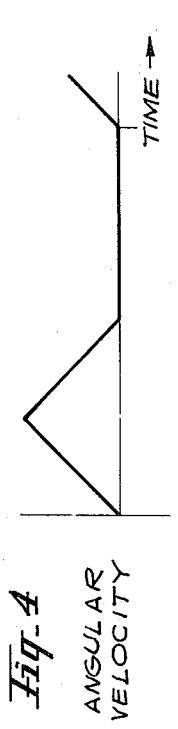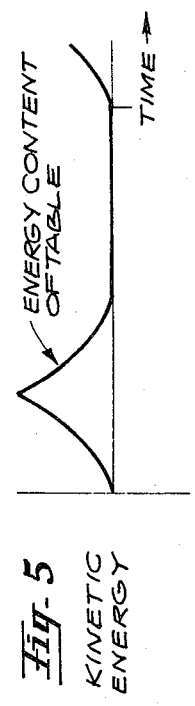

ENERGY STORAGE FOR INDEXING MECHANISM

BACKGROUND OF THE INVENTION

1. Field of the Invention

The present invention relates to indexing mechanisms wherein a work member is intermittently movable between a plurality of spaced dwell positions, and more specifically to apparatus for storing energy dissipated during one indexing cycle for use during a succeeding cycle.

2. Description of the Prior Art

In many manufacturing applications, there is a need to rapidly index a plurality of articles along a path of spaced work stations for a variety of work or testing functions, such as drilling, tapping, cutting, part insertion, quality checks, etc. The indexing period may be a major portion of the operation cycle. Therefore, the speed of indexing the articles between dwell periods at work stations has a great bearing on the efficiency and productivity of the machine.

Many indexing mechanisms employ rotary tables with some form of directly coupled cam-operated drive, such as the well-known Ferguson drive, to provide intermittent rotational movement to the table. The indexing speeds of such cam-operated drives cannot be readily controlled, and a new cam unit is generally required for each different angular speed vs. position profile.

To overcome these and other disadvantages, it has been suggested to drive rotary tables by means of a directly coupled servomotor. Using direct servomotor drive provides easily programmable speed vs. position profiles. However, rapid accelerations and decelerations of the rotary table require substantial armature current and resulting increases in servomotor temperature. This severly limits the servomotor performance.

SUMMARY OF THE INVENTION

In accordance with the present invention, the kinetic energy of an indexing work member (such as a rotary table) is converted, independently of its main drive motor, to potential energy and stored during deceleration of the work member as it approaches each of its dwell positions. During the initial portion of the next index step, the stored potential energy is imparted back to the work member, again independently of the drive motor, to assist in acceleration of the work member and to reduce the demands on the drive motor. Since the energy storage and transfer occurs independently of the drive motor, armature current and temperature of the drive motor are minimized for any given performance level.

The invention, and its objects and advantages, will become apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIGS. 3–5 are respectively graphs of table acceleration and torque, angular velocity, and energy content of an indexing table not utilizing the present invention; and FIGS. 6–8 are graphs similar to FIGS. 3–5 for an indexing table utilizing the present invention.

DESCRIPTION OF THE PREFERRED EMBODIMENT

Because intermittently indexing mechanisms such as rotary indexing tables are well known, the present description is directed in particular to elements forming part of or cooperating more directly with machine elements to which the present invention is specifically directed. Apparatus that is not specifically shown or described herein is understood to be selectable from apparatus known in the art.

It is to be further understood that although the description is directed to a rotary table with a plurality of workpiece holders on the table and a plurality of fixed work stations, other modes of practicing the invention will be obvious to those skilled in the art. For example, the workpiece holders may be indexed linearly along a row of work stations, or a plurality of work stations with appropriate tooling may be indexed along a fixed workpiece holder or holders. The inventive concept may be applied to reciprocating or oscillating devices also.

Figure 1:
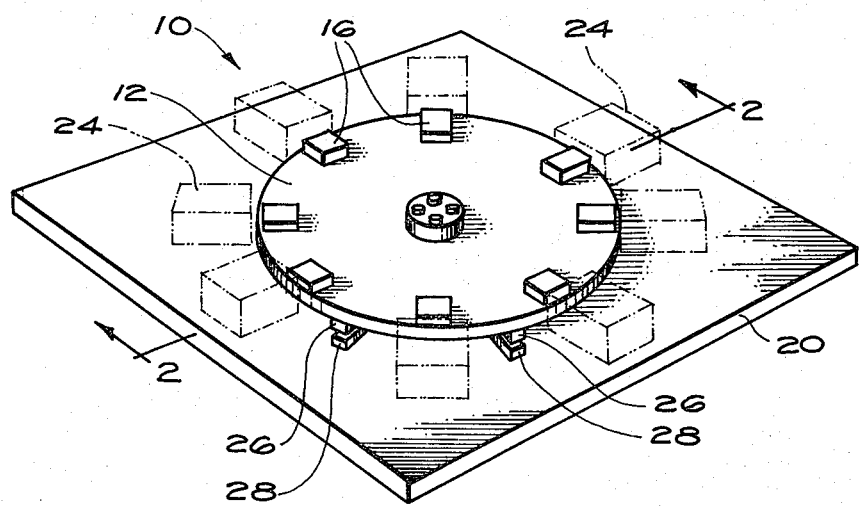
FIG. 1 is a schematic perspective view of a rotary table in accordance with the present invention.

Referring to FIG. 1, an indexing apparatus 10 includes a rotary table 12 provided with eight identical work holders 16. Various means, such as vacuum cups (not shown), for removably attaching the workpieces to holders 16 are known in the art. The most suitable means depends upon the nature of the workpieces and the operations to be performed at the work stations.

Figure 2:
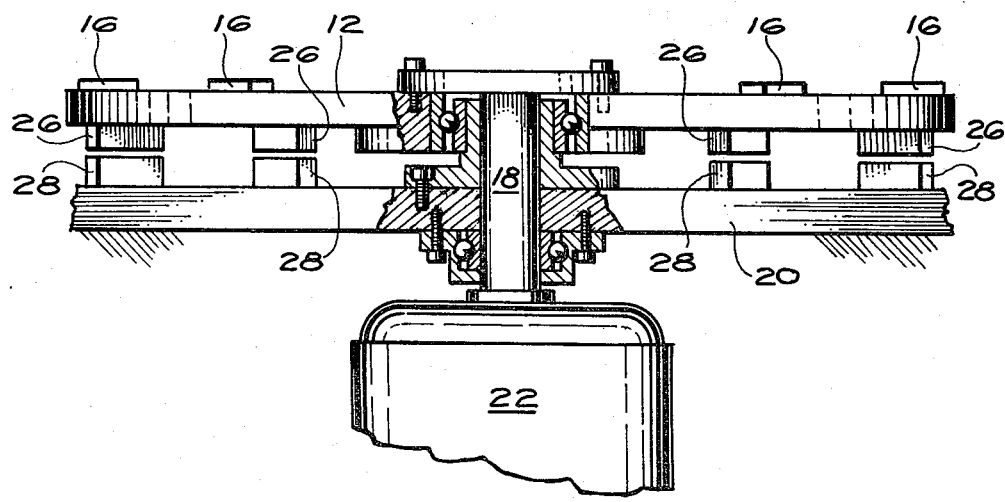
FIG. 2 is a sectional elevational view taken along line 2—2 of FIG. 1.

Rotary table 12 is fixed to a shaft 18 (FIG. 2) and the shaft, in turn, is journaled in a platform 20. The shaft is rotated by drive means, such as a servomotor 22, to index the rotary table successively through 45° increments or steps.

Although not illustrated, rotary table 12 may be provided with a built-in tachometer and a rotary incremental shaft angle encoder, such as the optical encoder model No. 106 manufactured by the Wayne-George Corp. of Newton, Mass., for velocity and position feedback to servomotor 22.

At the completion of each rotational increment of movement of table 12, the work holders are in respective registration with eight fixed work stations 24 (FIG. 1) on platform 20. The eight work stations may be arranged to collectively perform a series of different operations on each workpiece. Of course each operation may comprise a sequence of functions and some work stations may be non-functional. For purposes of illustration, the work station functions may include, workpiece transfer to a holder 16, drilling, tapping, insertion of subcomponents, inspection and testing, punching, workpiece unloading, and many others.

FIGS. 3, 4, and 5 are idealized graphs of acceleration and torque, angular velocity, and energy content of the table, respectively, during an index cycle without the energy storage apparatus of the present invention. If servomotor 22 drives the table directly it must supply both the acceleration and deceleration torques shown in FIG. 3. While supplying deceleration torque, energy will be dissipated.

Motor current will be approximately proportional to torque, and heating proportional to the square of the current. A constant acceleration has been used for illustration, although greater efficiency may be obtained with non-constant acceleration.

In accordance with the present invention, a of magnets 26 is mounted on the lower surface of index table 12 and another set of magnets 28 is mounted on the top surface of platform 20 so that like poles of magnets 26 and 28 align when the table is in any of its dwell positions; i.e., when work holders 16 align with fixed work station locations 24.

When the table begins to move from its dwell position, magnets 26 start to exert a repulsion force against magnets 28 in a direction assisting such movement. Less motor torque need be supplied to the table when the magnets assist acceleration than was necessary for the same amount of acceleration without magnets. Ideally, this amount of torque from servomotor 22 can be reduced to that level needed to overcome friction and to exert necessary controls over table 12, but for practical applications, such an ideal system would operate too slowly.

During the latter portion of an indexing cycle, each magnet 26 approaches the next succeeding magnet 28, and a repulsion force tending to slow the table begins to build. The repulsive forces brake, or assist in braking, the rotating table until it comes to a stop at a dwell position. The energy of the moving table is now transferred to storage (alignment of like magnetic poles) and the apparatus is ready for the next indexing step.

FIGS. 6, 7 and 8 show, also in idealized form, the acceleration and torque, angular velocity, and energy content of the table, respectively, during an index cycle if the energy dissipated during the deceleration period could be stored and used during the succeeding acceleration period. Once the system has been "charged" with energy, the energy circulates between storage and the table. FIG. 6 shows motor torque reduced to the level necessary to overcome friction losses. In practice, motor torque would probably show a positive pulse at the start of the index, and a negative pulse at the end, with zero in between, but the heating reduction would still accure because it depends on the time integral of current squared.

In the illustrated embodiment, the accelerating and decelerating torques are at their maximum values when the rotary table is near its dwell positions. This occurs when the repulsion magnets are aligned. However, for a given pair of magnets and a given air gap, forces of attraction exceed those available by repulsion. But, to use attraction forces, the magnets would need to be aligned at mid-index, resulting in peak torques when the table is furthest from its dwell positions. Whether to use repulsion or attraction is therefore a design question best answered by balancing the desirability of using less massive magnets in attraction verses the position of the table during periods of peak torque.

The invention has been described in detail with particular reference to one embodiment thereof, but it will be understood that other variations and modifications can be effected within the spirit and scope of the invention.

I claim:

1. Indexing apparatus comprising:
    a platform;
    a work member movable relative to said platform along a plurality of spaced dwell positions;
    drive means for intermittently moving said work member between the dwell positions;
    a plurality of first magnets on said work member and movable therewith; and
    a plurality of second magnets positioned on said platform such that poles of said first magnets align with like poles of said second magnets when said work member is in each of the dwell positions, whereby the kinetic energy of said work member approaching a dwell position is converted to stored energy by said first and second magnets and the stored energy is applied back to said work member as said work member moves away from a dwell position.

* * * * *

UNITED STATES PATENT AND TRADEMARK OFFICE
CERTIFICATE OF CORRECTION

PATENT NO. : 4,380,180

DATED : April, 19, 1983

INVENTOR(S) : James C. Foote and Dennis R. Zander

It is certified that error appears in the above—identified patent and that said Letters Patent is hereby corrected as shown below:

Column 1, line 58: After the word "become" insert the word--more--.

Column 3, line 3: After the word "a" insert the word--set--.

Column 4, line 1: Delete the word "accure" and insert the word--accrue--.

Signed and Sealed this

Eleventh Day of October 1983

[SEAL]

Attest:

Attesting Officer

GERALD J. MOSSINGHOFF

Commissioner of Patents and Trademarks